Jan. 17, 1961
D. E. BALLAST ET AL
2,968,066
FORMATION OF SOLID BEADS BY CONGELATION
OF SUSPENDED LIQUID DROPLETS
Filed April 3, 1958
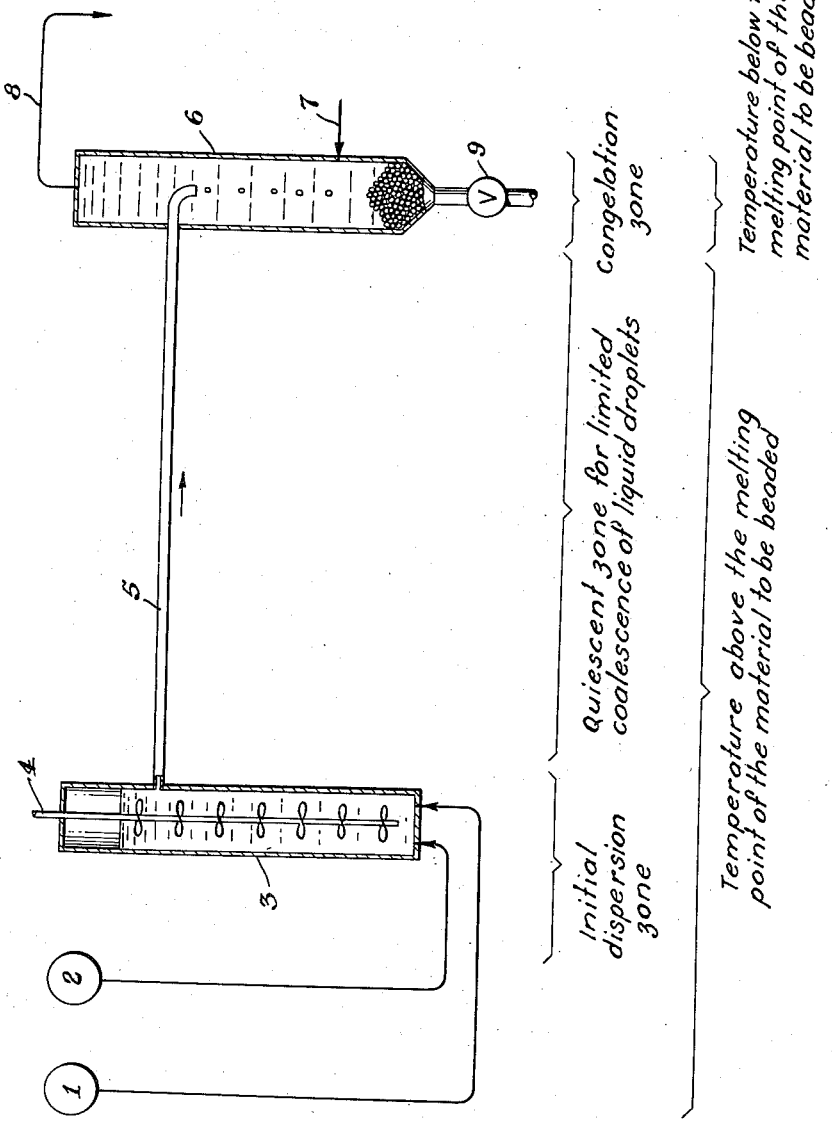
INVENTORS.
Donald E. Ballast
Ralph M. Wiley
BY Stanley I. Bates
L. J. Dankert
AGENT United States Patent Office 2,968,066
Patented Jan. 17, 1961

2,968,066

FORMATION OF SOLID BEADS BY CONGELATION OF SUSPENDED LIQUID DROPLETS

Donald E. Ballast, Ralph M. Wiley, and Stanley I. Bates, Midland, Mich., assignors to The Dow Chemical Company, Midland, Mich., a corporation of Delaware Filed Apr. 3, 1958, Ser. No. 726,096

1 Claim. (Cl. 18—48)

This invention pertains to the formation of solid beads by congelation of liquid droplets suspended in a non-solvent aqueous liquid medium.

Mechanical means of making solid bodies in bead form by molding in cavities are often tedious and costly, and to change the size of the beads produced requires changing the mold and sometimes requires rebuilding the machinery employed.

It is among the objects of this invention to provide a new unit process for making solid beads from compositions of matter that can exist reversibly in solid and liquid states.

A more particular object is to provide such a process for material compositions that are insoluble in water and not chemically reactive therewith under ordinary conditions and which in a solid state can be heated and melted to a liquid state that can be reversibly cooled and congealed to a solid state in the presence of a non-solvent liquid aqueous medium at temperatures between the freezing point and the boiling point of that medium.

Another object is to provide means for making a stable suspension of uniform-sized liquid droplets of a material composition in a non-solvent liquid aqueous suspending medium and congealing such droplets while so suspended to form solid beads of the material composition.

In another aspect the invention contemplates making solid beads in substantially uniform and perhaps preselected size.

Other objects and advantages of the invention will be evident from the following description.

It has now been discovered that the objects of this invention are attained and solid beads can be obtained as fully set forth below by carrying out a process that comprises the steps of dispersing a material composition in a liquid state at a temperature above its congelation temperature into a non-solvent liquid aqueous suspending medium containing a water-insoluble, hydrophilic, colloidal solid particle emulsifier, forming a two-phase, unstable liquid droplet dispersion in which the droplets are smaller-than-stable, bringing the resulting unstable dispersion to a condition of quiescence whereby the unstable droplets undergo a limited coalescence to form a stable suspension of liquid droplets having a substantially uniform size, optionally increasing the viscosity of the liquid aqueous suspending medium, and cooling the resulting suspension to a temperature below the congelation temperature of the dispersed droplets whereby the latter are caused to congeal and are transformed into solid beads.

The accompanying drawing is a schematic representation of one embodiment of the invention as set forth in the following examples. The examples illustrate the invention but are not to be construed as limiting its scope.

EXAMPLE 1

In this example, a supply of the material to be beaded was maintained in a liquid state at a temperature above its melting point in a reservoir corresponding to 1 in the drawing. A liquid aqueous suspending medium containing a water-insoluble, hydrophilic, colloidal solid particle emulsifier was prepared in a reservoir corresponding to 2 in the drawing. A stream of the material to be beaded was passed from source 1 and a stream of the aqueous suspending medium (at a temperature above the melting point of the material to be beaded) was passed from source 2 to a dispersion zone 3 having a motor-driven high speed multiple paddle agitator 4. In the dispersion zone 3, the liquid material to be beaded was dispersed into small droplets in the aqueous suspending medium, these droplets being smaller than were capable of being stabilized by the solid particle emulsifier in the aqueous suspending medium.

The resulting ultra-fine droplet dispersion passed from the dispersion zone 3 in non-turbulent flow through a smooth-bore conduit represented by 5 in the drawing. During passage through the conduit or channel 5, the dispersion was maintained at a temperature above the melting point of the dispersed material and (in non-turbulent flow) was substantially quiescent. Under these conditions, the unstable small droplets underwent a limited coalescence to form a lesser number of larger and uniform-sized droplets capable of being stabilized by the solid particle emulsifier in the aqueous suspending medium, whereupon coalescence ceased.

From channel 5, the stable dispersion of uniform-sized droplets was passed into a body of liquid in a congelation zone represented by 6 in the drawing. To zone 6 was also fed a stream of cooling water through inlet 7 whereby the temperature of the droplets entering zone 6 from channel 5 was lowered to below the melting-congelation temperature. Consequently, the droplets congealed into solid beads. The aqueous liquid suspending medium was withdrawn from zone 6 via line 8 and was discarded. The solid beads formed in zone 6 were collected, removed through valved outlet 9, and dried.

In instances where the density of the solid beads was greater than that of water, the beads were accumulated at the bottom of zone 6 and the water layer was withdrawn at the top of zone 6 as suggested by the drawing. In instances where the density of the beads was less than that of water, the structure and operation of zone 6 was inverted, i.e. cooling water was fed in near the top and the water phase was withdrawn from the bottom of zone 6, the lighter-than-water solid beads then being collected at the top of zone 6.

In the accompanying Table 1, the beading of a number of diverse kinds of materials is described. The table shows, for each run, the kind of material beaded, the kind of aqueous liquid dispersing medium, the ratio of the quantity (milliliters) of aqueous dispersing medium to the quantity (grams) of material to be beaded, the kind of water-insoluble, hydrophilic, solid particle emulsifier in the aqueous suspending medium and the proportion of the solid emulsifier (grams) per gram of the material beaded, the temperature maintained in the liquid droplet dispersion prior to congelation, and the temperature of the cooling water fed to the congelation zone. The table also shows the average bead diameter in millimeters and the coefficient of variation, i.e. the ratio of the standard deviation to the average diameter.

The diameter of the droplets of material to be beaded and hence the diameter of resulting solid beads can be varied predictably by deliberate variation of the composition of the aqueous liquid dispersion within the range of from about 0.1 or less to about 10 millimeters. In Example 2 that follows, all phases of the operation were held substantially constant except that the ratio of the quantity of material to be beaded to the quantity of water-insoluble, hydrophilic, collodial solid particle emulsifier was varied in the several runs.

Table 1

| (1) Run No. | (2) Material | (3) Suspension medium | (4) Ratio (3)/(2) cc./gm. | (5) Solid particle emulsifier | (6) Ratio (5)/(2) gms./gm. | (7) Temp., °C., liquid dispersion | (8) Temp., °C., cooling water | (9) Bead diameter, mm., average | (10) Coefficient of variation in bead diameters |
|---|---|---|---|---|---|---|---|---|---|
| 1 | p-Dichlorobenzene | Water [a] | 1.0 | Colloidal silica | 0.002 | 86 | 25 | 1.1 | 0.25 |
| 2 | ----do---- | ----do [a]---- | 1.0 | Cornstarch | 0.01 | 80 | 25 | 1.2 | 0.21 |
| 3 | ----do---- | Ethylene glycol, aq | 1.0 | ----do---- | 0.01 | 80 | 25 | 1.1 | 0.45 |
| 4 | Naphthalene | Water [a] | 1.0 | Colloidal silica | 0.001 | 93 | 25 | 0.9 | 0.14 |
| 5 | ----do---- | ----do [b]---- | 1.02 | Bentonite | 0.000106 | 95 | 25 | 1.3 | 0.09 |
| 6 | DDT | CaCl$_2$ 30% in water [b] | 1.08 | ----do---- | 0.00424 | 110 | 55 | 1.2 | 0.22 |
| 7 | Styrene dibromide | Water [b] | 1.2 | ----do---- | 0.00106 | 80 | 25 | 0.8 | 0.17 |
| 8 | Paraffin wax | Ethylene glycol, aq | 1.0 | Cornstarch | 0.01 | 80 | 24 | 0.9 | 0.39 |

[a] Containing, per gram of silica, two grams of a water-soluble resinous condensation product of equal moles of ethylenediamine and adipic acid.
[b] Containing, per gram of the bentonite, 1.8 grams of a water-soluble resinous condensation product of equal moles of ethylenediamine and adipic acid and 1.8 grams of a water-soluble resinous condensation product of urea, ethylene oxide, and formaldehyde.

EXAMPLE 2

In this example, p-dichlorobenzene was beaded in a continuous manner in an apparatus conforming in principle to the arrangement shown schematically in the drawing. The p-dichlorobenzene was maintained in a reservoir corresponding to 1 in the drawing at a temperature shown in Table 2 in the range from 65° to 70° C. The aqueous liquid suspending medium was prepared and held in a reservoir corresponding to 2 of the drawing. The aqueous liquid suspending medium consisted of distilled water and colloidally dispersed bentonite clay and, per gram of the bentonite clay, 1.8 grams each of (1) a water-soluble condensation product of equal moles of ethylenediamine and adipic acid and (2) a water-soluble condensation product of urea, ethylene oxide, and formaldehyde. The concentration of the bentonite clay in the aqueous liquid suspending medium was changed from run to run as indicated in Table 2.

The melted p-dichlorobenzene and the aqueous liquid suspending medium were fed to the dispersing zone corresponding to 3 in the drawing at equal average rates of approximately 800 mls. per hour and at a temperature indicated in Table 2. The resulting dispersion passed through the quiescent limited coalescence zone corresponding to 5 in the drawing to the congelation zone 6 where the dispersion was mixed with cold water entering at 7 and flowing at an average rate of 3.6 gallons per hour, and the temperature was reduced to approximately 25° C.

When the operation of each run had seemingly reached a steady state, a sample of the solid beads was taken, and their diameters were measured. Table 2 shows the average bead diameter and the coefficient of variation of such diameters, i.e. the ratio of the standard deviation to the average diameter.

Table 2

| Run No. | Grams bentonite per liter of aqueous liquid medium | Liters of p-dichlorobenzene per gram of bentonite | Temperature in dispersion zone, °C. | Bead diameter, mm., average | Coefficient of variation in bead diameters |
|---|---|---|---|---|---|
| 9 | 0.13 | 7.64 | 70 | 1.1 | 0.193 |
| 10 | 0.052 | 19.1 | 65 | 2.3 | 0.186 |
| 11 | 0.021 | 47.7 | 70 | 3.6 | 0.116 |
| 12 | 0.0131 | 76.4 | 70 | 4.1 | 0.101 |
| 13 | 0.0105 | 95.4 | 65 | 5.0 | 0.109 |
| 14 | 0.00787 | 127.2 | 70 | 5.8 | 0.168 |

Since the bead size, e.g., diameter, in the present method is determined principally by the composition of the aqueous disperison, the mechanical conditions, such as the degree of agitation, the size and design of the apparatus used, and the scale of operation, are not highly critical. Furthermore, by employing the same composition, the operations can be repeated, or the scale of operations can be changed, and substantially the same results can be obtained.

The present method is carried out by dispersing one part by volume of the liquid state of a starting material to be beaded into at least 0.5, preferably from 0.5 to about 10 or more, parts by volume of a non-solvent aqueous medium comprising water and at least the first of the following ingredients:

(1) A water-dispersible, water-insoluble, solid colloidal particle emulsifier capable of stablizing an oil-in-water dispersion, the particles of which in aqueous dispersions have dimensions in the order of from about 0.1 to about 50 microns, i.e., from about $10^{-5}$ to about $5 \times 10^{-3}$ centimeters, which particles tend to gather at the liquid-liquid interface or are caused to do so by the presence of (2) A water-soluble "promoter" that affects the "hydrophilic-hydrophobic balance" of the solid colloidal particles.

The liquid constituent of the aqueous suspending medium can consist essentially of water or can be a water solution that is not reactive chemically with the other constituents of the resulting dispersion under the conditions of the subsequent operations. In runs 3 and 8 of Example 1 above, the suspension medium contained ethylene glycol, and in run 6 the suspension medium contained 30 percent by weight of calcium chloride. Selection can be made from any water-soluble solute to prepare an aqueous solution for purpose of providing a suspending medium having, for example, desired density, boiling or freezing point, or viscosity.

The water-dispersible, water-insoluble, solid colloidal particle emulsifiers can be inorganic materials such as metal salts or hydroxides or clays, or can be organic materials such as raw starches, sulfonated crosslinked organic high polymers, resinous polymers and the like. The solid colloidal material must be insoluble but dispersible in water and both insoluble and non-dispersible in, but wettable by, the liquid material to be beaded. The solid colloidal particles must be much more hydrophilic than oleophilic so as to remain dispersed wholly within the aqueous liquid. The solid colloidal materials employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight crosslinked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloidal particles emulsifier that is employed usually corresponds to from about 0.005 to about 10 or more grams per liter of the material to be beaded.

In order to function as a stabilizer for the limited coalescence of the liquid droplets, it is essential that the solid colloidal particles must tend to collect within the aqueous liquid at the liquid-liquid interface, i.e., on the surface of the dispersed droplets. In many instances, it is desirable to add a "promoter" material to the aqueous composition to drive the particles of the solid colloid to the liquid-liquid interface. This phenomenon is well known in the emulsion art, and is here applied to solid colloidal emulsifier particles, as a means of adjusting the "hydrophilic hydrophobic balance."

Usually, the promoters are organic materials that have an affinity for the solid colloidal particles and also for the oil droplets and that are capable of making the solid colloidal particles more oleophilic. The affinity for the oil surface is usually due to some organic portion of the promoter molecule while the affinity for the solid colloidal particles is usually due to opposite electrical charges. For example, positively charged complex metal salts or hydroxides, such as aluminum hydroxide, can be promoted by the presence of negatively charged organic promoters such as water-soluble sulfonated polystyrenes, alginates and carboxymethylcellulose. Negatively charged colloidal particles, such as bentonite, are promoted by positively charged promoters such as tetramethyl ammonium hydroxide or chloride or water-soluble complex resinous amine condensation products such as the water-soluble condensation products of ethylenediamine and adipic acid, the water-soluble condensation products of diethanolamine and adipic acid, the water-soluble condensation products of ethylene oxide, urea and formaldehyde, and polyethylenimine. Amphoteric materials and proteinaceous materials such as gelatin, glue, casein, albumin, glutin and the like, are effective promoters for a wide variety of colloidal solids. Non-ionic materials like methoxycellulose are also effective in some instances. Usually, the promoter need be used only to the extent of a few parts per million of aqueous medium although larger proportions can often be tolerated. In some instances, ionic materials normally classed as emulsifiers, such as the soaps, long chain sulfates and sulfonates and the long chain quaternary ammonium compounds, can also be used as promoters for the solid colloidal particles, but care must be taken to avoid concentrations sufficient to cause the formation of stable colloidal emulsions of the liquid form of the material to be beaded and the aqueous liquid medium.

The solid colloidal particles whose hydrophilic-hydrophobic balance is such that the particles tend to gather in the aqueous phase at the oil-water interface gather on the surface of the dispersed droplets and function as protective agents in the phenomenon of limited coalescence.

Other agents that can be employed in already known manner to effect modification of the colloidal properties of the aqueous composition are those materials known in the art as peptizing agents, flocculating and deflocculating agents, sensitizers, surface active agents and the like.

The phenomenon of limited coalescence and stabilization of uniform droplets of liquids in non-solvent aqueous suspending media using colloidal solid particle emulsifiers is thoroughly described by R. M. Wiley in Journal of Colloid Science, vol. 9, pages 427–436 (1954). The preparation of suitable dispersions of materials to be beaded in aqueous media containing solid particle emulsifiers in accordance with this invention is in accordance with these already known principles of colloid science.

The aqueous medium containing the water-dispersible solid colloidal particle emulsifiers is admixed with the liquid material to be beaded and the mixture is subjected to agitation means in such a way as to disperse the liquid material as small droplets within the aqueous medium. The dispersion can be accomplished by any usual agitation means, e.g., by mechanical stirrers or shakers, by pumping through jets, by impingement, or by other such procedure causing subdivision of the material into droplets in a continuous aqueous medium.

The degree of dispersion, e.g., by agitation, is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence," as described in the Wiley publication mentioned above, is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

In the present method, the steps of forming the initial dispersion and of effecting limited coalescene of the dispersed droplets are carried out at temperatures above the melting points and below the boiling points of the liquid phases. If necessary, pressures above atmospheric pressure can be used to raise the boiling point of the dispersion. After occurrence of limited coalescence, the dispersed droplets are congealed and transformed into solid beads by lowering the temperature of the dispersion to below the congelation temperature of the dispersed material (but above the congelation temperature of the continuous suspending medium).

In instances where the density of the dispersed liquid droplets is considerably different from that of the aqueous suspending medium, the droplets may tend to rise or settle in such medium and may press together and tend to adhere together in clumps when congealed. This tendency can be minimized by insuring adequate separation of the droplets in the liquid dispersion, e.g. by sufficient dilution with the suspending medium, and by further separation in the congelation zone by dilution with the cooling medium. Optionally, the separation of the droplets can be insured and congregation of the droplets can be retarded by increasing the viscosity of the aqueous suspending medium after the occurrence of limited coalescence of the unstable smaller droplets and formation of uniform-sized stable droplets.

This further stabilization is accomplished by gently admixing with the uniform droplet dispersion an agent capable of greatly increasing the viscosity of the aqueous liquid. For this purpose there can be used any water-soluble or water-dispersible thickening agent that is insoluble in the nonaqueous droplets and that does not remove the layer of solid colloidal particles covering the surface of the dispersed droplets at the droplet-water interface. Examples of suitable thickening agents are sulfonated polystrenes (water-dispersible, thickening grade), hydrophilic clays such as bentonite, digested starch, natural gums, carboxy-substituted cellulose ethers and the like.

After congelation of the dispersed liquid droplets, the resulting solid beads can be recoverd from the aqueous liquid medium in obvious ways, e.g. by decantation, filtration through screens, or centrifugation. The beads can be washed with water or other suitable agents to remove residual aqueous suspending medium and dried, e.g., in a current of air.

In the foregoing specific examples, the invention was illustrated in respect to the beading of a number of diverse kinds of materials, viz. p-dichlorobenzene, naphthalene, 1,1,1 - trichloro - 2,2-bis-(p-chlorophenyl)ethane (DDT), styrene dibromide, and paraffin wax. Other starting materials can be employed in place thereof with substantially the same results when such starting materials are insoluble in and chemically non-reactive with the aqueous liquid suspending medium under the conditions of the subsequent operations and can exist reversibly in a liquid state and in a congealed solid state at temperatures between the freezing point and the boiling point of that medium.

The method of the invention is advantageous in making solid materials in bead form and particularly in making such beads of substantially uniform and preselected sizes.

What is claimed is:

A method for making solid material in bead form which comprises forming by agitation means an unstable dispersion of droplets of that material in a liquid state in at least half its volume of an aqueous liquid suspending medium, the material to be beaded being one that is insoluble in and chemically non-reactive with the aqueous suspending medium in the subsequent operations and that is capable of existing reversibly in liquid and solid states while dispersed in the aqueous suspending medium at temperatures between the freezing point and boiling point of the aqueous suspending medium, the aqueous suspending medium being one that contains a colloidally dispersed water-insoluble, hydrophilic, colloidal solid particle emulsifier capable of stabilizing an oil-in-water suspension, the colloidal solid particle emulsifier being present in amount corresponding to from 0.005 to 10 grams per liter of the dispersed liquid material, said unstable dispersion being made at a temperature above the congelation temperature and below the boiling temperature of the liquid constituents of the dispersion and by agitation means to disperse the liquid droplets in smaller-than-stable sizes in the aqueous liquid suspending medium, bringing the resulting unstable dispersion to a condition of quiescence at a temperature above the congelation temperature and below the boiling temperature of the liquid constituents of the dispersion, whereby the unstable droplets undergo a limited coalescence to form a stable suspension of droplets having substantially uniform size, and bringing the resulting stable dispersion to a temperature below the congelation temperature of the material in the dispersed droplets but above the congelation temperature of the aqueous suspending medium, whereby the liquid droplets are transformed into solid beads having substantially uniform sizes.

References Cited in the file of this patent

UNITED STATES PATENTS

| | | |
|---|---|---|
| 1,614,636 | Wachtel | Jan. 18, 1927 |
| 2,800,457 | Green et al. | July 23, 1957 |
| 2,800,458 | Green | July 23, 1957 |

OTHER REFERENCES

Wiley, R. M.: Journal of Colloid Science, vol. 9, pp. 427–436, 1954.